(12) United States Patent
Zhong et al.

(10) Patent No.: US 11,601,020 B2
(45) Date of Patent: Mar. 7, 2023

(54) INCOMPLETELY COMPENSATED WIRELESS POWER TRANSFER SYSTEM

(71) Applicant: ZHEJIANG UNIVERSITY, Hangzhou (CN)

(72) Inventors: Wenxing Zhong, Hangzhou (CN); Dehong Xu, Hangzhou (CN)

(73) Assignee: Zhejiang University, Zhejiang (CN)

( * ) Notice: Subject to any disclaimer, the term of this patent is extended or adjusted under 35 U.S.C. 154(b) by 0 days.

(21) Appl. No.: 17/631,477

(22) PCT Filed: Oct. 18, 2019

(86) PCT No.: PCT/CN2019/103779
§ 371 (c)(1),
(2) Date: Jan. 30, 2022

(87) PCT Pub. No.: WO2021/072736
PCT Pub. Date: Apr. 22, 2021

(65) Prior Publication Data
US 2022/0278563 A1     Sep. 1, 2022

(30) Foreign Application Priority Data

Oct. 15, 2019  (CN) .......................... 201910978600.8

(51) Int. Cl.
*H02J 50/12*     (2016.01)
*H02J 50/80*     (2016.01)
(Continued)

(52) U.S. Cl.
CPC .............. *H02J 50/80* (2016.02); *H02J 50/05* (2016.02); *H02J 50/12* (2016.02); *H02J 50/90* (2016.02)

(58) Field of Classification Search
CPC .. H02J 50/80; H02J 50/05; H02J 50/12; H02J 50/90
See application file for complete search history.

(56) References Cited

U.S. PATENT DOCUMENTS 7,999,633 B2   8/2011  Xu et al.
10,411,515 B2  9/2019  Lee et al.
(Continued)

FOREIGN PATENT DOCUMENTS

CN      104092316 A    10/2014
CN      104092316 B     5/2016
(Continued)

OTHER PUBLICATIONS

Feng, "A Dual-Side-Detuned Series-Series Compensated Resonant Converter for Wide Charging Region in a Wireless Power Transfer System," IEEE Transactions on Industrial Electronics, pp. 2177-2188 (Year: 2018).*

(Continued)

*Primary Examiner* — Pinping Sun
(74) *Attorney, Agent, or Firm* — Swope & Yuy Ang IP Law Group

(57) ABSTRACT

Disclosed in the present application is an incompletely compensated wireless power transfer system. On the basis of an SS compensated wireless power transfer system topology, a primary side capacitor $C_1$ and a secondary side capacitor $C_2$ take specific values, and in combination with a phase shift frequency modulation control method, a coupling range of a system output rated power is improved. According to the present application, by finding an appropriate combination of the primary side capacitor $C_1$ and the secondary side capacitor $C_2$, the system can output a required rated power in a larger coupling range under the condition of incomplete compensation.

4 Claims, 6 Drawing Sheets

(51) Int. Cl.
   *H02J 50/90* (2016.01)
   *H02J 50/05* (2016.01)

(56) References Cited

U.S. PATENT DOCUMENTS

| | | | |
|---|---|---|---|
| 2011/0199799 A1* | 8/2011 | Hui | H02M 7/06 |
| | | | 363/127 |
| 2017/0279309 A1* | 9/2017 | Lee | B60L 53/126 |
| 2019/0036441 A1* | 1/2019 | Eggers | B60L 53/122 |
| 2020/0287413 A1* | 9/2020 | Peretz | H02M 3/33573 |
| 2022/0037926 A1* | 2/2022 | Omori | H02J 7/00034 |

FOREIGN PATENT DOCUMENTS

| | | | |
|---|---|---|---|
| CN | 105680577 A | | 6/2016 |
| CN | 106532982 A | | 3/2017 |
| CN | 107425610 A | | 12/2017 |
| CN | 108155729 A | | 6/2018 |
| CN | 207835173 U | | 9/2018 |
| CN | 109861405 A | * | 6/2019 |
| KR | 20170110886 A | | 10/2017 |

OTHER PUBLICATIONS

EENG441,"EENG441 solved problems," 2012, pp. 1-13 (Year: 2012).*

Zhong, "A Design Method for Large-Coupling-Range Series-Series Compensated WPT Systems under Practical Constraints," 2021 IEEE 12th Energy Conversion Congress & Exposition—Asia (ECCE—Asia), pp. 2470-2475 (Year: 2021).*

International Search Report (PCT/CN2019/111919); dated Jun. 22, 2020.

Effect of Compensation Parameter on Characteristics of Series/Series Compensated Wireless Power Transfer System, Apr. 10, 2019.

Modeling and Analysis of Series/series Compensated Wireless Power Transfer system, May 25, 2017.

Search report in the First Office Action of Chinese Priority application 2019109786008, dated Sep. 28, 2020.

A Maximum Efficiency Point Tracking Control Scheme for Wireless Power Transfer Systems Using Magnetic Resonant Coupling, Jul. 31, 2015.

Analysis and Tracking of Optimal Load in Wireless Power Transfer Systems, Jul. 31, 2015.

Boost-LLC High Efficiency DC/DC Converter, Aug. 31, 2010.

Research on Compensations under Condition of Parameters Variations in Inductive Power Transfer Systems, Feb. 15, 2019.

Research on Single-phase ZVS Inverter with Active Power Decoupling, Jun. 15, 2018.

Reducing Extended Magnetic Stray Field in Wireless Charging Systems of Electric Vehicles, Dec. 27, 2018.

* cited by examiner

INCOMPLETELY COMPENSATED WIRELESS POWER TRANSFER SYSTEM

TECHNICAL FIELD

The application belongs to the technical field of wireless power transmission, and relates to a wireless power transfer system, in particular to an incompletely compensated wireless power transfer system.

BACKGROUND

FIG. 1 is a simplified circuit model of a SS compensation (series-series, that is, the primary and secondary sides are series-compensated) wireless power transfer system. On the primary and secondary sides, the coil forms LC resonance with a capacitor in series connection, which is called a harmonic oscillator. The steady-state operation of this system can be described by the equations (1) (2).

$$(R_1+jX_1)I_1+j\omega M_{12}I_2=V_1 \quad (1)$$

$$j\omega M_{12}I_1+(R_2+R_L+jX_2)I_2=0 \quad (2)$$

where $R_i$, i=1 or 2, is the parasitic resistance in the circuit, generally including the resistance of a coil and the equivalent series resistance of the capacitor; $X_i=\omega L_i-1/(\omega C_i)$, i=1 or 2, is the reactance of the harmonic oscillator i; $I_1$ and $I_2$ are the current phasors of the primary and secondary side loops respectively; $V_1$ is the phasor of an input voltage; $M_{12}$ is the mutual inductance of the two coils; $R_L$ is equivalent load resistance; $\omega=2\pi f$ is angular frequency (f is the frequency of the power supply).

According to the theory of wireless power transmission, $X_i=0$ (that is, full compensation) can obtain the highest power transmission efficiency and the smallest input apparent power (that is, the input voltage is in phase with the input current).

Under the premise of complete compensation, the reflected impedance produced by the secondary side in the primary side is:

$$Z_r = R_r = \frac{\omega^2 M_{12}^2}{R_2 + R_L} \quad (3)$$

In the case of a given input voltage and equivalent load resistance, ignoring the effect of parasitic resistance, the output power of the system is:

$$P_{out} = \frac{V_1^2}{Z_r} = \frac{V_1^2 R_L}{\omega^2 M_{12}^2} \quad (4)$$

It can be seen that the output power of the system is inversely proportional to the square of the mutual inductance.

Therefore, under the condition of complete compensation and constant operating frequency, the system can only achieve the required rated power at a certain mutual inductance value.

To illustrate with specific examples, the used coil parameters are listed in Table 1. The direct current input voltage of the system is 400V, the rated output power is 3.3 kW, and the direct current output voltage is 400V. FIG. 2 is a finite element simulation model. FIG. 3 is the curve of the output power of the system changing with the air gap distance. It can be seen that when the air gap distance is 18 cm, the system can output 3.3 kW. As the distance decreases, the output power will not reach the required power rating; when the distance increases, the output power will exceed the rated value. When the distance is greater than 18 cm, through the phase shift control of the inverter, the input voltage acting on the primary side harmonic oscillator can be reduced, but the input current at the rated output power will be greater than the value at 18 cm. For example, at 18 cm, if the input direct current voltage is 400V, after full-bridge rectification, a high-frequency square wave is obtained, and the effective value of the fundamental wave is about 360V. At this time, the input current is about 9.2 A and the output power is 3.3 kW; while at 20 cm, through the phase shift control, the effective value of the fundamental wave is reduced to 267 V, the input current is 12.4 A, and the output power is 3.3 kW, but the input current is increased by 35% compared with 18 cm.

TABLE 1

| Coil parameters | | | |
|---|---|---|---|
| A plurality of wires of winding | Diameter of each wire 0.1 mm; 500 wires | Number of winding turns | 32 |
| Winding size of the coil | 350 mm × 350 mm × 3.2 mm | Turn pitch | 0 |
| Distance between the winding and the magnetic core | 1.5 mm | Distance between magnetic core and aluminum plate | 15 mm |
| Aluminum plate size | 555 mm × 555 mm × 4 mm | Core thickness | 370 mm × 370 mm × 3.5 mm |

It can be seen that the coupling range of the output rated power of the traditional fully compensated SS wireless power transfer system is very limited. And although the available coupling range can be increased through phase shift control, the current caps of the coils, compensation capacitors, and inverters must also be increased. Obviously, the fully compensated SS wireless power transfer system has great limitations in practical applications.

SUMMARY OF THE APPLICATION

The purpose of the present application is to provide an incompletely compensated wireless power transfer system that can substantially improve the output rated power coupling range of the system in response to the shortcomings of the prior art. The system uses an incompletely compensated solution, and the core lies in how to obtain an appropriate capacitance combination.

The technical solution adopted by the present application is as follows:

An incompletely compensated wireless power transfer system is based on the SS-compensated wireless power transfer system topology, a primary side capacitance $C_1$ and a secondary side capacitance $C_2$ take specific values, and a phase shift frequency modulation control method is combined, to increase the coupling range of the rated output power of the system;

with incomplete compensation, that is, $Xi \neq 0$, equation (3) becomes $$Z_r = R_r = \frac{\omega^2 M_{12}^2}{R_2 + R_L + jX_2} \quad (5)$$

ignoring the parasitic resistance, the input impedance of the system is:

$$Z_{in} = jX_1 + Z_r = jX_1 + \frac{\omega^2 M_{12}^2}{R_L + jX_2} = \frac{\omega^2 M_{12}^2}{R_L^2 + X_2^2} R_L + j\left(X_1 - \frac{\omega^2 M_{12}^2}{R_L^2 + X_2^2} X_2\right) \quad (6)$$

assuming that the imaginary part of the input impedance can be equal to zero, the output power is:

$$P_{out} = \frac{V_1^2}{\frac{\omega^2 M_{12}^2}{R_L^2 + X_2^2} R_L} = \frac{V_1^2}{\omega^2 M_{12}^2}\left(R_L + \frac{X_2^2}{R_L}\right) \quad (7)$$

By comparing equations (7) and (4), it can be found that by introducing $X_2$, the output power of the system can be increased. For the rated output power required by the system, from equation (7), the required $X_2$, under any mutual inductance can be solved, and the required $C_2$ can be solved correspondingly. After obtaining $X_2$, the imaginary part of the equation (6) is set to zero, and the required $X_1$ can be solved, and the required $C_1$ can be solved accordingly. This is a theoretical calculation of a certain mutual inductance value, which can ensure the required power output and make the input voltage and input current in phase, so as to minimize the input apparent power.

In practical applications, on the one hand, $V_1$ can be turned down by phase shift control, so $X_2$ in equation (7) can have different solutions at different $V_1$; on the other hand, the input voltage and input current are not necessarily in phase. In a full-bridge inverter, the input current is generally required to lag behind the voltage to achieve zero-voltage turn-on.

Therefore, for an application scenario with a given coupling range and a given restriction, it is necessary to find suitable primary side capacitance $C_1$ and secondary side capacitance $C_2$, so that the system outputs the required power within this coupling range and restriction.

The primary side capacitance $C_1$ and the secondary side capacitance $C_2$ are selected as follows:

Setting restrictions:
1) Rated output voltage $V_{out}$ and power $P_{out}$;
2) Range of operating frequency $f_{min} \leq f \leq f_{max}$;
3) Coupling range of the coil $M_{12min} \leq M_{12} \leq M_{12max}$;
4) direct current input voltage $V_{DC}$; for example, 400V output from a previous stage PFC. Alternating current voltage that actually acts on the primary harmonic oscillator, which can be adjusted by phase shift control.
5) Maximum primary current $I_{1max}$; affects the selection of inverter switching tubes, compensation capacitors, wires used for coils, etc.
6) The primary input current should lag the input square wave to achieve zero-voltage turn-on. FIG. 4 shows the relationship between voltage and current, where $v_{in}$ is the output square wave of the full-bridge inverter after phase shift control, and $v_1$ is the fundamental wave of this square wave. $i_1$ is the input current. To achieve zero-voltage turn-on, the zero-crossing point of $i_1$ should lag behind the zero-crossing point of $v_{in}$, i.e., $\phi < 0$, that is:

$$\theta + 90° - \arcsin\left(\frac{\pi V_1}{2\sqrt{2} \cdot V_{DC}}\right) < 0; \quad (8)$$

where $\theta$ is the phase angle of the input current relative to $v_1$; $V_1$ is the effective value of the fundamental wave of the inverter output square wave, which can be calculated by the following equation:

$$V_1 = \frac{2\sqrt{2}}{\pi} V_{DC} \sin\left(\frac{\alpha}{2}\right); \quad (9)$$

$\alpha$ is the angle occupied by half wave of the square wave, and the angle is 180° when the duty ratio is 1.

By solving the above equations, the range of $C_1$ and $C_2$ that satisfy all the above conditions can be obtained.

The application also provides several specific methods for obtaining the combination of $C_1$ and $C_2$ that meet the requirements more quickly. The method of solving a group of inequalities and equations can be used to solve the combination of $C_1$ and $C_2$ for the two extreme positions of the strongest coupling and the weakest coupling; traversal calculation can also be used to quickly find all capacitor combinations that meet the conditions.

In the present application, by finding a suitable combination of the primary side capacitance $C_1$ and the secondary side capacitance $C_2$, the system can output the required rated power in a larger coupling range under the condition of incomplete compensation.

BRIEF DESCRIPTION OF THE DRAWINGS

In order to explain the technical solutions in the embodiments of the present application or the prior art more clearly, the drawings used in the description of the embodiments or the prior art will be briefly introduced below. Obviously, the drawings in the following description are only examples of the application. For those skilled in the art, other drawings can be obtained based on the provided drawings without creative work.

DETAILED DESCRIPTION

Figure 1:
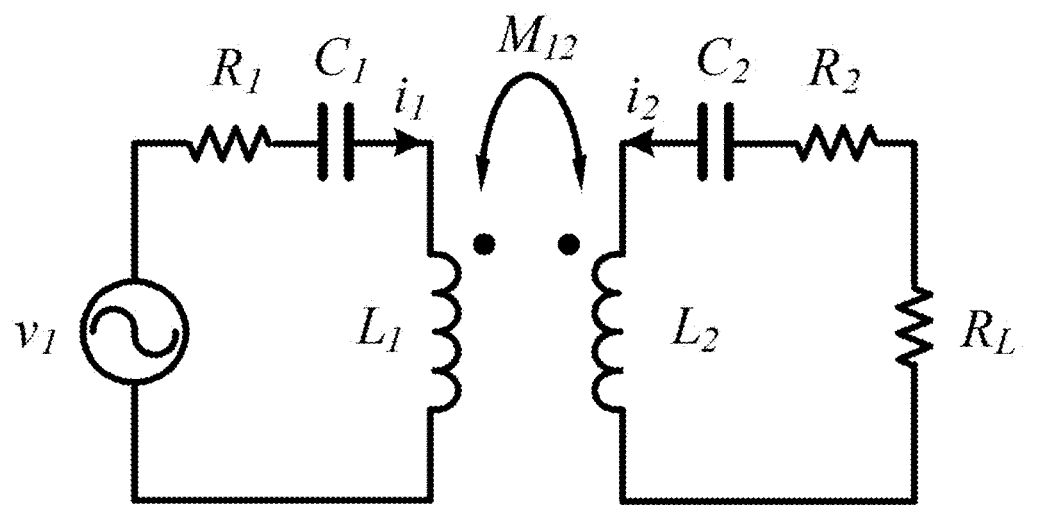
FIG. 1 is a simplified circuit model of an SS-compensated wireless power transfer system.

In the following, the technical solutions in the embodiments of the present application will be clearly and completely described with reference to the drawings in the embodiments of the present application. Obviously, the described embodiments are only a part of the embodiments of the present application, but not all of the embodiments. Based on the embodiments in the present application, all other embodiments obtained by those skilled in the art without creative efforts shall fall within the protection scope of the present application.

The incompletely compensated wireless transmission and charging system of the present application is based on the SS compensated wireless power transfer system topology, taking a primary side capacitance $C_1$ and a secondary side capacitance $C_2$ to specific values, and combining the phase-shift and frequency-modulation control method to meet the given coupling range and given restriction conditions, thereby increasing the coupling range of the system's output rated power;

For any given f, $M_{12}$, $C_1$, $C_2$, assuming that the duty cycle of the inverter output square wave is 1, and the peak value is $V_{DC}$, the effective value of the fundamental wave of the square wave is:

$$V_1 = \frac{2\sqrt{2}}{\pi} V_{DC} \qquad (10)$$

For a given rated output voltage $V_{out}$ and power $P_{out}$, the equivalent alternating current load impedance $R_L$ can be calculated from:

$$R_L = \frac{8}{\pi^2} \frac{V_{out}^2}{P_{out}} \qquad (11)$$

Assuming that the phase of $v_1$ is zero, that is, V1=V$_1$. Substituting V1 and $R_L$ into equations (1) and (2), for values of any set of $C_1$, $C_2$, $M_{12}$, f, the currents of the primary and secondary side can be solved by equations (1) and (2), assuming that their effective values are respectively $I_1$ and I2, and the phase angle of the primary current $I_1$ is θ. The output power when the input voltage is $V_1$ can be calculated by the following equation:

$$P_{out\_V1} = I_2^2 R_L \qquad (12)$$

If $$P_{out\_V1} < P_{out} \qquad (13)$$

it means that the system cannot output the required power under this set of parameters; if $$P_{out\_V1} \geq P_{out} \qquad (14)$$

it means that the system can output the required power through phase shift control. At this time, the effective value of the fundamental wave of the square wave required by the system is:

$$V_{1\_Pout} = V_1 \sqrt{\frac{P_{out}}{P_{out\_V1}}} \qquad (15)$$

The effective value of the input current required by the system can also be obtained:

$$I_{1\_Pout} = I_1 \sqrt{\frac{P_{out}}{P_{out\_V1}}} \qquad (16)$$

From (9), the phase difference between the current zero-crossing point and the zero-crossing point of the input square wave can be calculated as:

$$\phi = \theta + 90° - \arcsin\left(\frac{\pi V_{1\_Pout}}{2\sqrt{2} \cdot V_{DC}}\right) \qquad (17)$$

Theoretically, it is possible to solve the equations by mathematical methods to obtain the range of the primary and secondary side capacitances $C_1$ and $C_2$ that meet all the restrictions, that is, the combination of $C_1$ and $C_2$.

In actual operation, based on the above ideas, it is also possible to find all the combinations of $C_1$ and $C_2$ that meet the conditions faster by directly using traversal calculations, as follows:

a) for a given relative position range of the coil, first use the finite element simulation method to obtain corresponding coil self-inductance and mutual-inductance ranges [$L_{imin}$, $L_{imax}$], [$M_{12min}$, $M_{12max}$];

b) assuming that the operating frequency of the system is $f_{min}$ at $M_{12min}$ and that the operating frequency of the system is $f_{max}$ at $M_{12max}$. To improve the system transfer efficiency at the weakest coupling position, $C'_1$, $C'_2$ under full compensation at $M_{12min}$ may be calculated; taking $C'_1$, $C'_2$ as the center, determining the range of $C_1$ and $C_2$ to undergo traversal: [$C_{1min}$, $C_{1max}$], [$C_{2min}$, $C_{2max}$], the initial range can be set by oneself, usually 0.5 C'~1.5 C'. Then, according to a certain step, taking the capacitor combination value in an exhaustive manner, and when the calculated operating distances are $M_{12min}$ and $M_{12max}$ respectively, verifying one by one whether the selected capacitance combination can meet all the restriction conditions, if it meets, then keeping the capacitance combination, if it does not meet, then removing it;

c) assuming that the operating frequency of the system is $f_{max}$ at $M_{12min}$ and that the operating frequency of the system is $f_{min}$ at $M_{12min}$. To improve the system transfer efficiency at the weakest coupling position, $C''_1$, $C''_2$ under full compensation at $M_{12min}$ may be calculated; taking $C''_1$, $C''_2$ as the centers, determining the range of $C_1$ and $C_2$ to undergo traversal: [$C_{1min}$, $C_{1max}$], [$C_{2min}$, $C_{2max}$]. Similarly, the initial range can be set by oneself, usually 0.5 C"~1.5 C". Taking the capacitor combination value in an exhaustive manner, and when the calculated operating distances are $M_{12min}$ and $M_{12max}$ respectively, verifying one by one whether the selected capacitor combination can meet all the restriction conditions, if it meets, then keeping the capacitor combination, if it does not meet, then removing it;

d) the solution set of the capacitor combination that meets the conditions can be obtained through the above two steps; if the solution is an empty set, it means that the set restriction conditions are not reasonable, and the restriction conditions should be appropriately relaxed, such as increasing the limit of the primary current, or reducing the air gap range. The capacitor combination solution that meets the conditions are found through traversal again.

The above steps find a capacitor combination that can meet the restrictions at the two extreme positions corresponding to $M_{12min}$ and $M_{12max}$. Then taking the air gap distance within [$M_{12min}$, $M_{12max}$] in a certain step in an exhaustive manner, and obtaining the self-inductance and mutual-inductance data by simulation, and calculating the input voltage, input current, the phase difference between the zero-crossing point of input current and the zero-crossing point of input square wave (that is, $\phi$), and the change characteristics of the output power with the operating frequency. Therefore, a system control strategy is formulated by combining phase shift frequency modulation.

Figure 2:
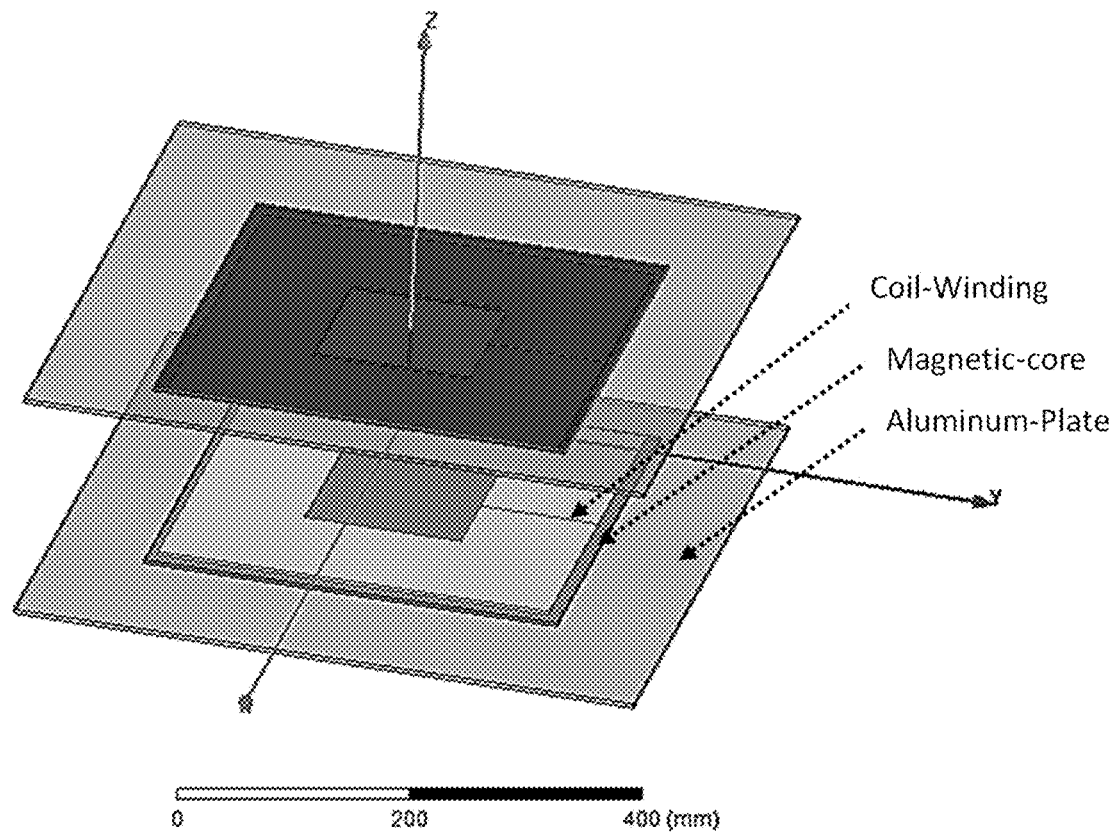
FIG. 2 is a finite element simulation model of the coil.
Figure 3:
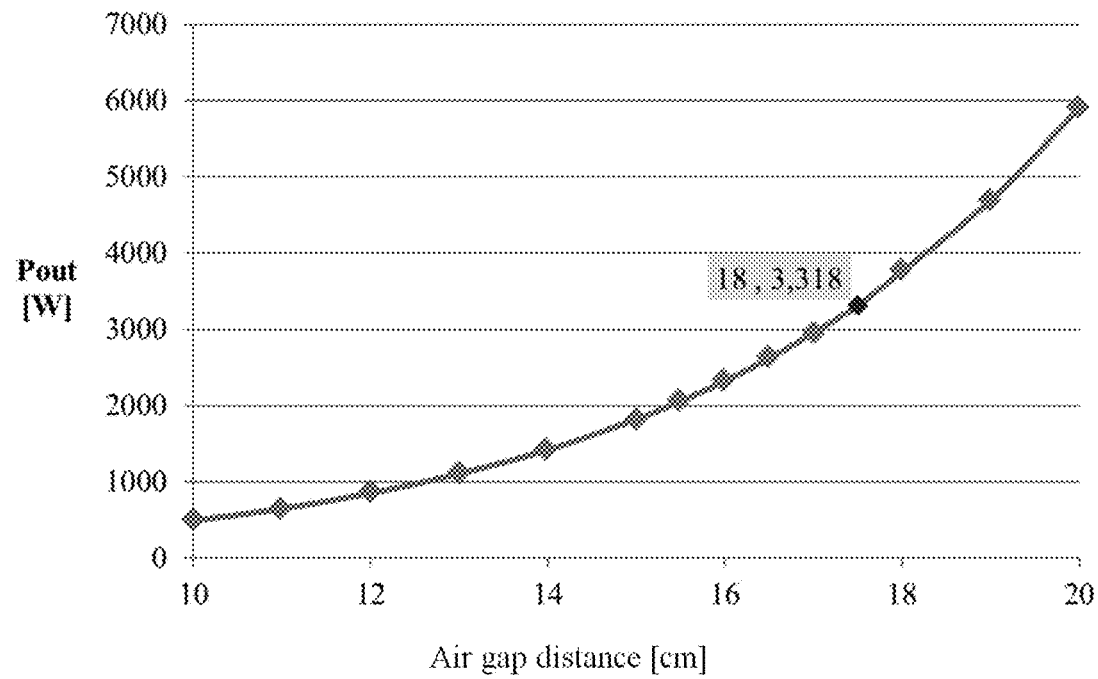
FIG. 3 is the curve of the output power of the SS compensation system changed with the air gap distance.
Figure 4:
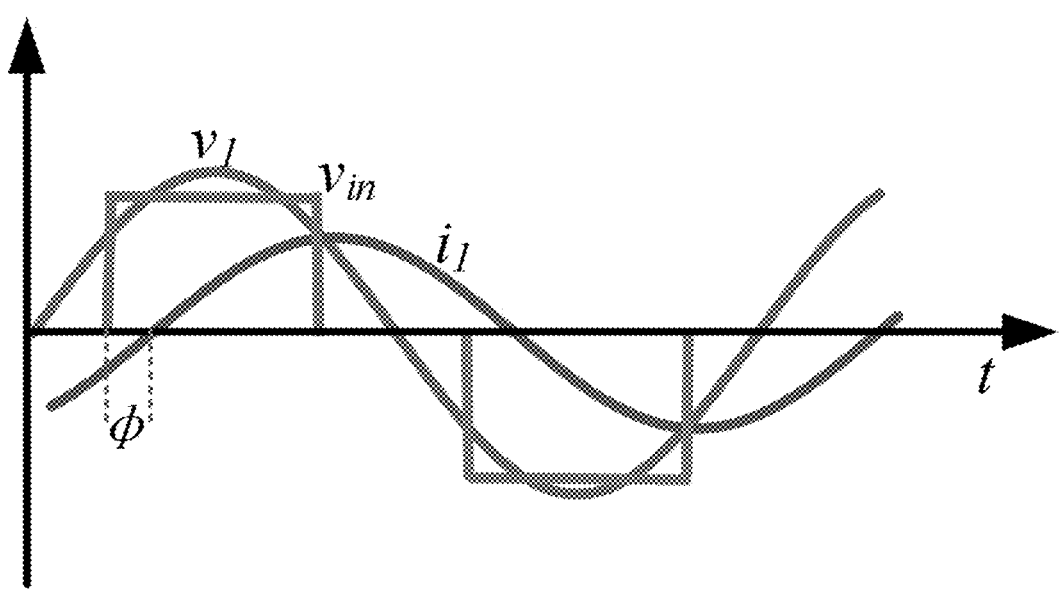
FIG. 4 is a schematic diagram of the input current lagging behind the input square wave.
Figure 5A:
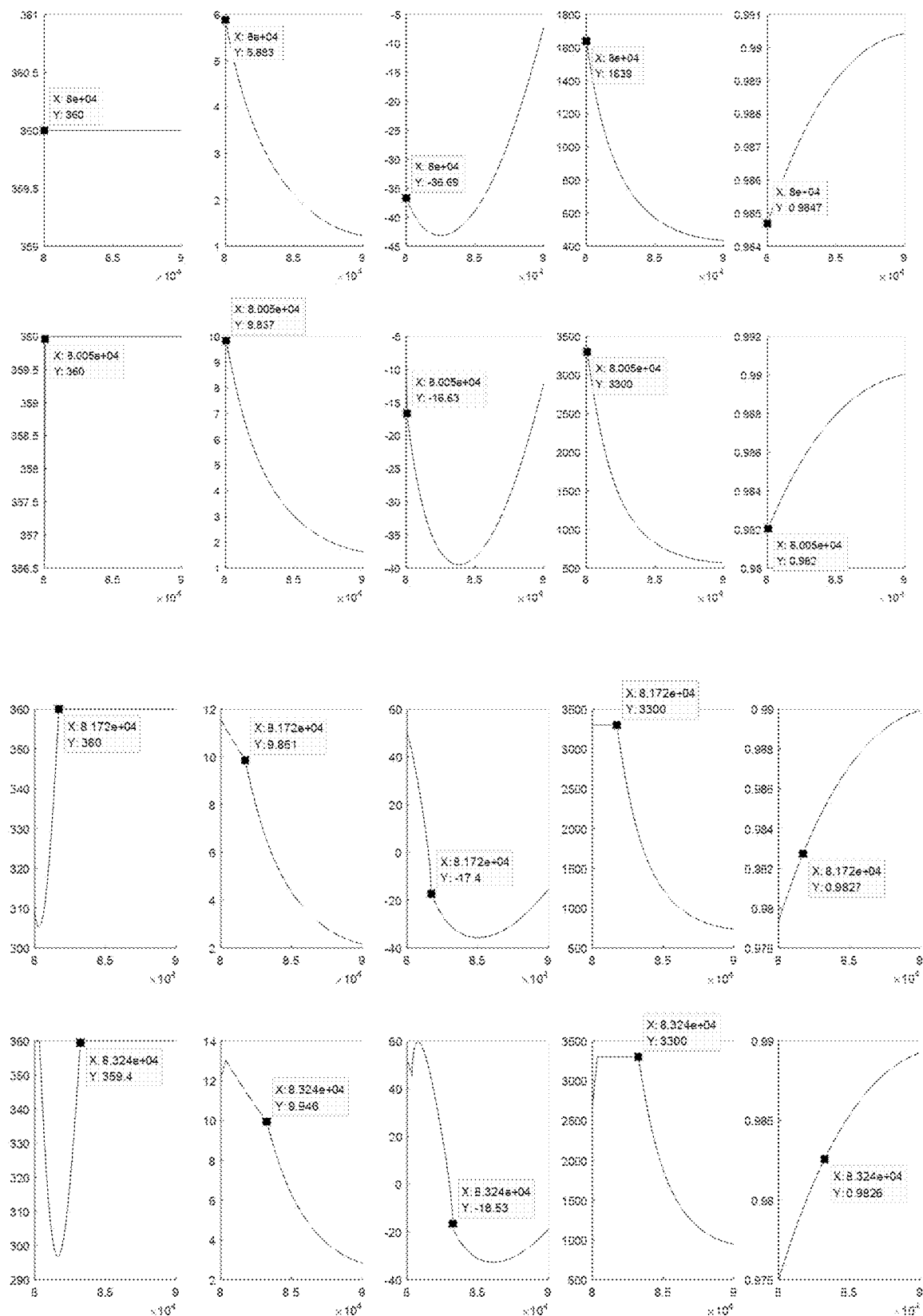
FIG. 5 is the variation of the input voltage, input current, the phase difference between the zero-crossing point of the input current and the zero-crossing point of the input square wave, the output power, and the coupling coil transmission efficiency (corresponding to the vertical axis of each column from left to right) with the operating frequency in the range of 10 cm to 20 cm air gap (from top to bottom each line corresponds to an air gap) of the system.
Figure 5B:
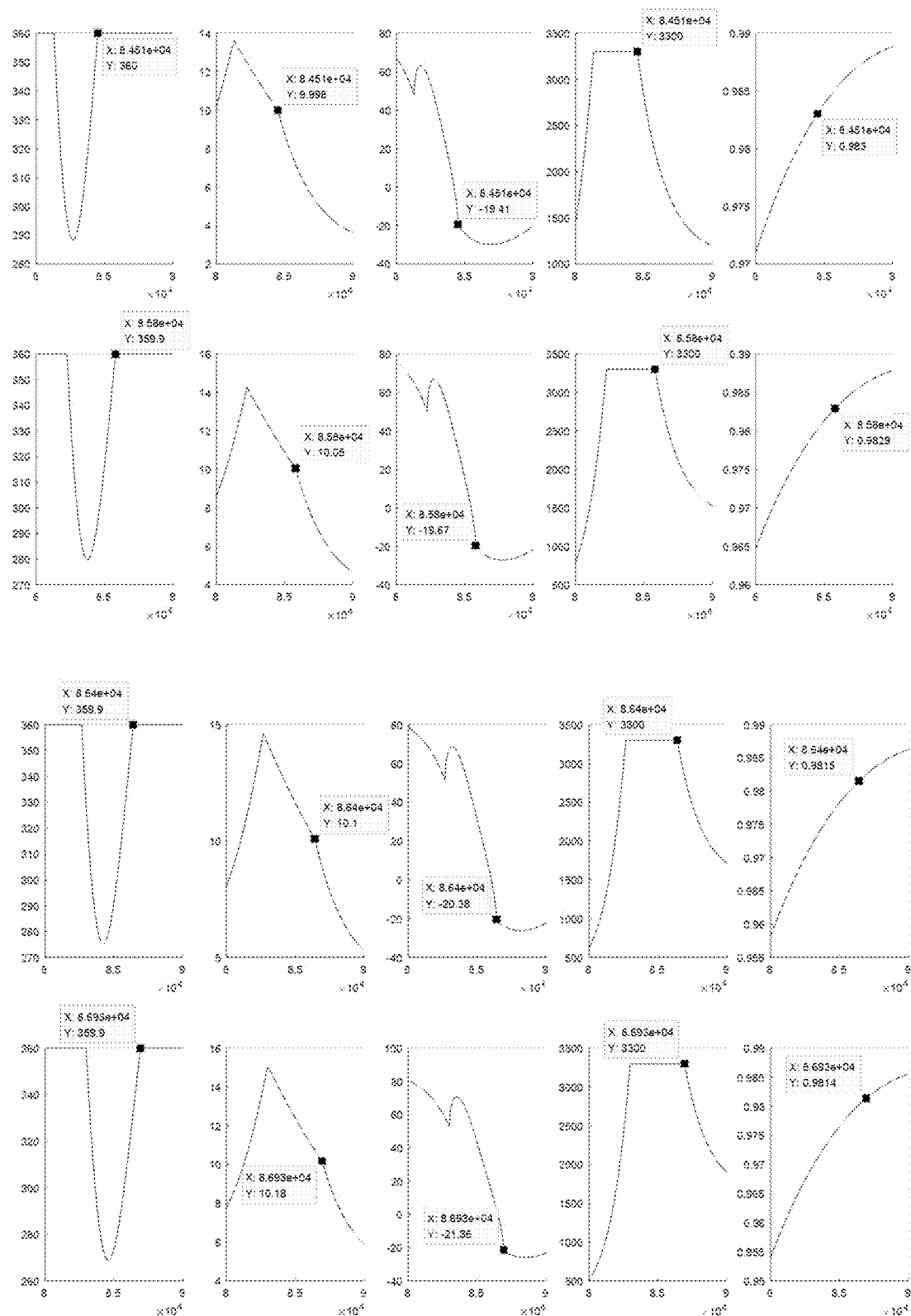
Figure 5C:
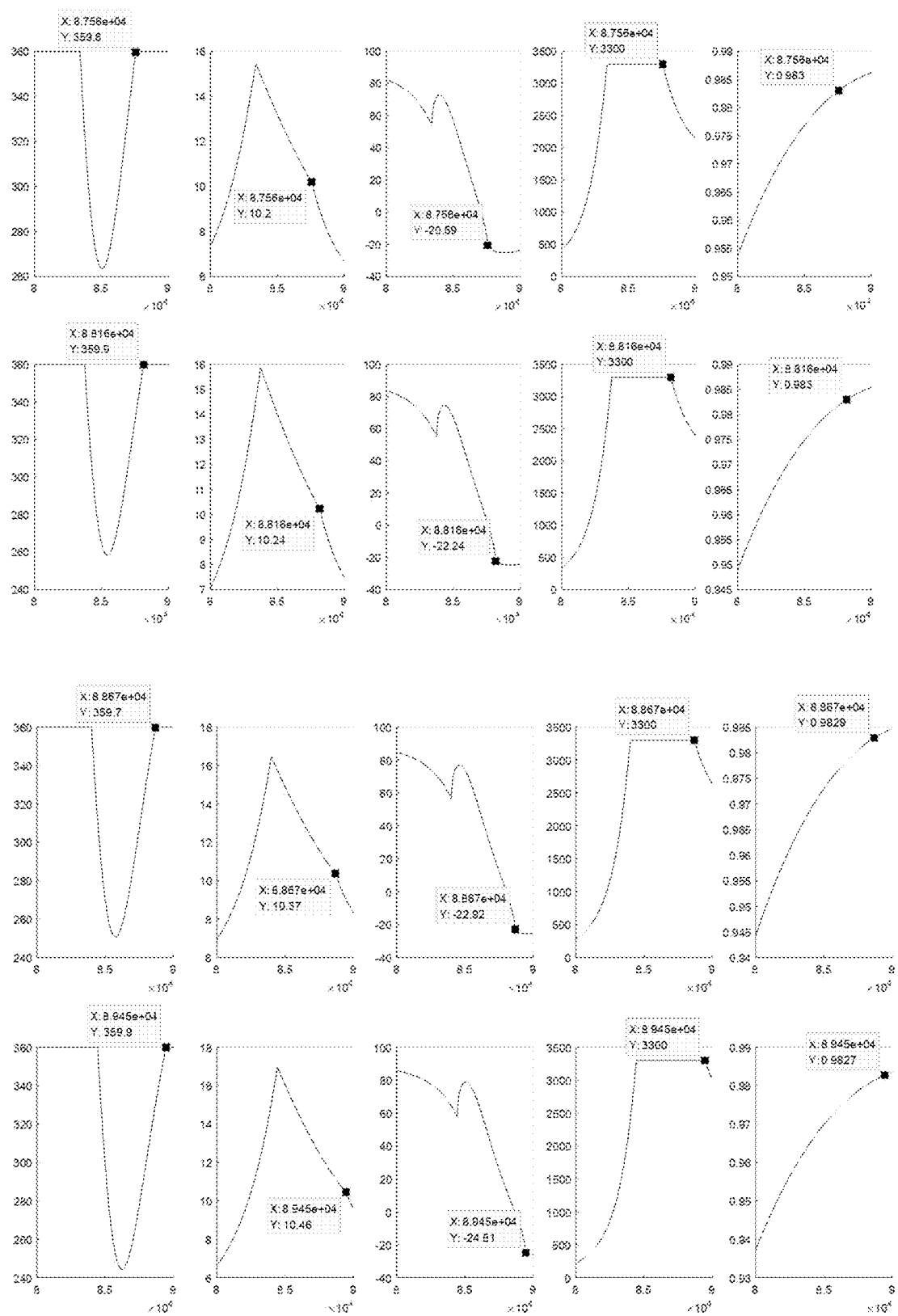
Figure 5D:
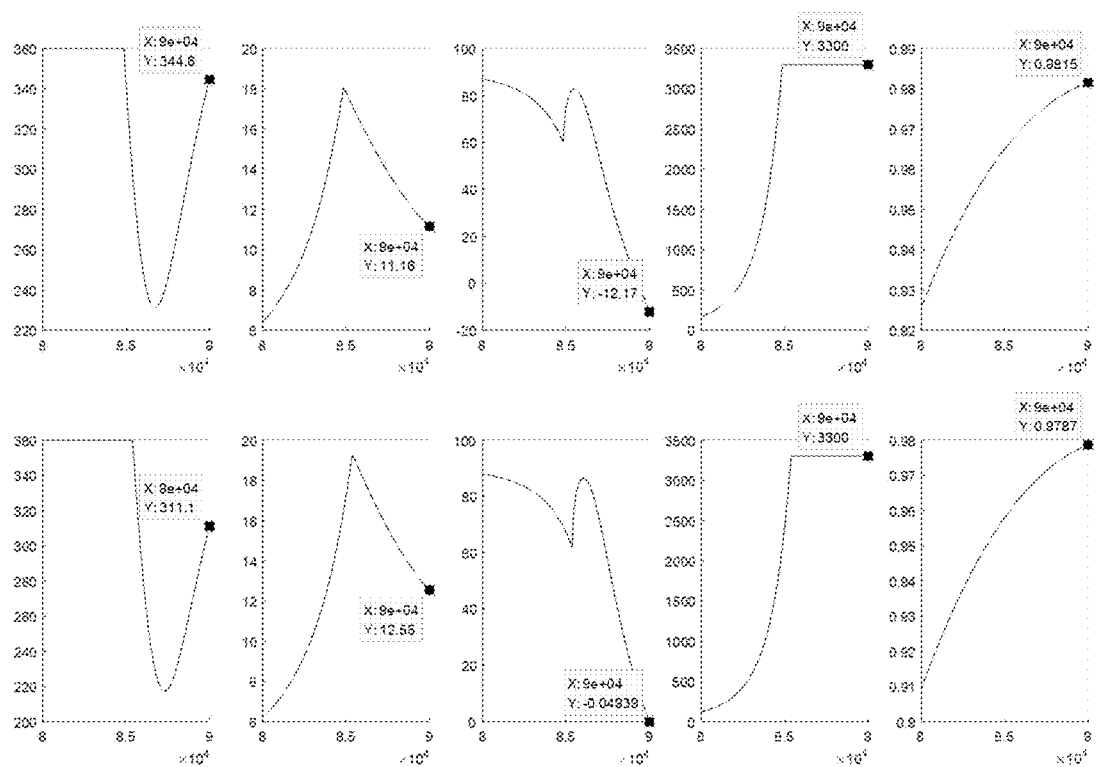

Take the wireless power transfer system defined in Table 1 and FIG. 2 as an example. $V_{DC}$ is 400 V; $V_{out}$ is 400 V; $P_{out}$ is 3.3 kW; $I_{1max}$ is 12.6 A; air gap range is 11 cm to 20 cm (coils directly opposite).

First, the step size for traversing the capacitance combination is set to 0.01 pF. Through the above methods, the combinations of $C_1$ and $C_2$ that meet the restrictions are found: (6.03 pF, 5.65 pF), (6.04 pF, 5.65 pF), (6.05 pF, 5.65 pF). Because the three combined values are close, the impact on system performance is small. Take (6.03 pF, 5.65 pF) here for verification. In some cases, a relatively large range of capacitance combinations may be obtained. In practice, the error range of the capacitance needs to be considered, and then a combination with high system efficiency and small input current (which affects the efficiency of the inverter and the selection of the switch) is selected. This case study does not consider the error range of the capacitance.

FIG. 5 lists in the range of 10 cm to 20 cm air gap, the change of the input voltage, input current, phase difference (that is ϕ) between the zero-crossing point of the input current and the zero-crossing point of the input square wave, the output power, and the coupling coil transmission efficiency with the operating frequency of the system. Seen from left to right, the vertical axis of the first column is the effective value V1 of the fundamental wave of the input square wave. When the duty cycle is 1, V1 is about 360 V. If the output power is greater than the rated output power when the duty ratio is 1, then V1 is reduced through the phase shift control to make the output power up to 3.3 kW. The vertical axis of the second column is the effective value of the input current. The vertical axis of the third column is the phase difference (i.e., ϕ) between the zero crossing point of the input current and the zero crossing point of the input square wave. The vertical axis of the fourth column is the output power. The fifth column of the vertical axis is the transmission efficiency of the coupling coil. From top to bottom, the corresponding air gap ranges for each row of the curve are: 10 cm, 11 cm, 12 cm, 13 cm, 14 cm, 15 cm, 15.5 cm, 16 cm, 16.5 cm, 17 cm, 17.5 cm, 18 cm, 19 cm, 20 cm.

It can be seen from the results in FIG. 5 that the air gap is from 11 cm to 20 cm, that is, within the set range, the system can output the required rated power. The data points marked in the figure are the operating points under the corresponding air gap.

The specific control strategies adopted are:

Set the starting operating frequency (for example, set at 90 kHz), and set the starting square wave duty cycle (for example, set at 0). With the same frequency, gradually increase the duty cycle until the rated power is output. If the rated power is still not output when the duty cycle is 1, the operating frequency is gradually reduced in a certain step until the system can output the rated power.

As can be seen from FIG. 5, under this control strategy, the system can achieve zero voltage turn-on in all operating areas.

The maximum primary current of the system is 12.55A (corresponding air gap distance is 20 cm). Compared with the fully compensated wireless energy transmission system, which normally operates with an air gap range of 18 cm to 20 cm when the current is increased by 35%, the method of the present application can greatly increase the coupling range of the system output rated power.

The technical solution provided by the present application has been described in detail above. Specific examples are used herein to explain the principle and implementation of the present application. The description of the above embodiments is only used to help understand the method of the present application and its core ideas. It should be noted that, for those skilled in the art, without departing from the principle of the present application, several improvements and modifications can be made to the present invention, and these improvements and modifications also fall within the protection scope of the claims of the present application.

What is claimed is:

1. An incompletely compensated wireless power transfer system, comprising: two coils and two compensation capacitors, wherein on basis of an Series-Series (SS) compensated wireless power transfer system topology, a primary side compensation capacitance $C_1$ and a secondary side compensation capacitance $C_2$ take specific values, and a phase shift frequency modulation control method is combined, to increase a coupling range of rated output power of the system; values of the primary side compensation capacitance $C_1$ and the secondary side compensation capacitance $C_2$ are obtained by a first method described below:

1) circuit equations of a wireless charging transfer system:

$$(R_1+jX_1)I_1+j\omega M_{12}I_2=V_1 \quad (1)$$

$$j\omega M_{12}I_1+(R_2+R_L+jX_2)I_2=0 \quad (2)$$

where $R_i$, i=1 or 2, is parasitic resistance, generally including coil resistance and equivalent series capacitor resistance; $X_i=\omega L_i-1/(\omega C_i)$, i=1 or 2, is reactance of a harmonic oscillator i; $L_i$, $C_i$, i=1 or 2, are coil inductance and compensation capacitance, $I_1$ and $I_2$ are current phasors of a primary loop and a secondary loop respectively; $V_1$ is input voltage phasor; $M_{12}$ is mutual inductance of the two coils; $R_L$ is equivalent load resistance; $\omega=2\pi f$ is angular frequency, and f is frequency of a power supply;

2) with rated output direct current (DC) voltage $V_{out}$ and power $P_{out}$, the equivalent load resistance is obtained by:

$$R_L = \frac{8}{\pi^2}\frac{V_{out}}{P_{out}} \quad (3)$$

3) range of operating frequency is given by:

$$f_{min} \leq f \leq f_{max} \quad (4)$$

wherein $f_{min}$ is a minimum value of f and $f_{max}$ is maximum value of f;

4) coupling range of the two coils is obtained by:

$$M_{12min} \leq M_{12} \leq M_{12max} \quad (5)$$

wherein $M_{12min}$ is a minimum value of $M_{12}$ and $M_{12max}$ is a maximum value of $M_{12}$;

5) based on DC input voltage $V_{DC}$, through a phase shift control, $V_{1\_r}$ is an effective value of a fundamental wave of a square wave applied to a primary LC harmonic oscillator is limited by:

$$V_{1\_r} \leq \frac{2\sqrt{2}}{\pi}V_{DC} \quad (6)$$

6) maximum primary current $I_{1max}$, is obtained by:

$$I_1 \leq I_{1max} \quad (7)$$

where, $I_1$ is an effective value of the current phasor $I_1$;

7) a primary input current configured to lag behind an input square wave to achieve zero voltage turn-on, is obtained by:

$$\theta + 90° - \arcsin\left(\frac{\pi V_1}{2\sqrt{2} \cdot V_{DC}}\right) < 0 \qquad (8)$$

where θ is a phase angle of the primary input current phasor $I_1$ with respect to an input voltage phasor $V_1$, and $V_1$ is an effective value of a fundamental wave of an inverter output square wave:

$$V_1 = \frac{2\sqrt{2}}{\pi} V_{DC} \sin\left(\frac{\alpha}{2}\right); \qquad (9)$$

α is an angle occupied by a half wave of the inverter output square wave, and is 180° when a duty cycle of the inverter output square wave is 1;

8) calculating the coil resistance via a finite element simulation; the equivalent series resistance of a compensation capacitor configured to be estimated by the following method: the coil inductance is $L_i$, then the compensation capacitance $C_i$ is approximately resonance capacitance value $C_{i0}$, and a calculation method of the resonance capacitance value and corresponding equivalent series resistance is as follows:

$$C_{i0} = \frac{1}{\omega^2 L_1}; \qquad (10)$$

$$R_{Ci} \approx \frac{\tan\delta}{\omega C_{i0}}; \qquad (11)$$

where tan δ is a tangent value of a loss angle of the compensation capacitor;

when in simplified calculation, the parasitic resistance is neglected;

for given coils $L_1$ and $L_2$, in combination with above operating conditions, ranges of $C_1$ and $C_2$ that simultaneously meet conditions is obtained by a numerical solution method.

2. The incompletely compensated wireless power transfer system according to claim 1, wherein all combinations of $C_1$ and $C_2$ that meet the conditions are obtained faster than the first method by solving a group of equations and inequalities, as follows:

1) giving the DC input voltage $V_{DC}$, the rated output DC voltage $V_{out}$ and the power $P_{out}$, the equivalent load resistance is obtained by:

$$R_L = \frac{8}{\pi^2} \frac{V_{out}}{P_{out}} \qquad (12)$$

2) for a given relative position range of a coil of the two coils, obtaining corresponding ranges of the coil inductance and mutual inductance $[L_{imin}, L_{imax}]$ (i=1 or 2), $[M_{12min}, M_{12max}]$ by the finite element simulation, and calculating the coil resistance ; according to equations (10) and (11), estimating the capacitor resistance at a strongest coupling position or a weakest coupling position, when in the simplified calculation, the parasitic resistance is neglected;

3) at the weakest coupling position, wherein $M_{12}=M_{12min}$, the operating frequency is the highest, so that $f=f_{max}$; when a duty cycle of the input square wave is 1, so that $$V_1 = \frac{2\sqrt{2}}{\pi} V_{DC} \qquad (13)$$

using the input voltage as a reference, so that $V_1=V_1$; substituting $R_L$, $M_{12min}$, $L_{1min}$, $L_{2min}$, $f_{max}$, $R_1$, $R_2$ and $V_1$ into equations (1) and (2), and obtained that:

$$I_1 = \frac{V_1}{R_1 + j\left(\omega_{max}L_{1min} - \frac{1}{\omega_{max}C_1}\right) + \frac{\omega_{max}^2 M_{12min}^2}{R_2 + R_L + j\left(\omega_{max}L_{2min} - \frac{1}{\omega_{max}C_2}\right)}} \qquad (14)$$

$$I_2 = \frac{-j\omega_{max}M_{12min}V_1}{\omega_{max}^2 M_{12min}^2 + \left[R_1 + j\left(\omega_{max}L_{1min} - \frac{1}{\omega_{max}C_1}\right)\right]\left[R_2 + R_L + j\left(\omega_{max}L_{2min} - \frac{1}{\omega_{max}C_2}\right)\right]} \qquad (15)$$

where $\omega_{max}=2\pi f_{max}$;

the output power corresponding to the input voltage $V_1$ is calculated by the following equation:

$$P_{out\_V_1} = |I_2|^2 R_L \qquad (16)$$

with the rated output power being $P_{out}$, obtaining the following inequality:

$$P_{out\_V_1} \geq P_{out} \qquad (17)$$

under equation (17), the system is configured to output a required rated power by the phase shift control; and an effective value of a fundamental wave of a square wave required by the system is:

$$V_{1\_P_{out}} = V_1 \sqrt{\frac{P_{out}}{P_{out\_V_1}}} \qquad (18)$$

an effective value of an input current required by the system:

$$I_{1\_P_{out}} = |I_1| \sqrt{\frac{P_{out}}{P_{out\_V_1}}} \qquad (19)$$

with a maximum value of a given input current being $I_{1max}$, obtaining the following inequality:

$$I_{1\_P_{out}} \leq I_{1max} \qquad (20)$$

a phase difference between a zero crossing point of the input current and a zero crossing point of the input square wave is:

$$\phi = \theta + 90° - \arcsin\left(\frac{\pi V_{1\_P_{out}}}{2\sqrt{2} \cdot V_{DC}}\right) \qquad (21)$$

where θ is the phase angle of the primary input current phasor $I_1$, in order to achieve zero-voltage turn-on of an input inverter, the phase difference is configured to satisfy the following inequality:

$$\phi < 0 \qquad (22)$$

4) at the strongest coupling position, wherein $M_{12}=M_{12max}$, the operating frequency is the lowest, so that $f=f_{min}$; assuming the duty cycle of the input square wave is 1, using the input voltage as a reference, so that $V_1=V_1$; substituting $R_L$, $M_{12max}$, $L_{1max}$, $L_{2max}$, $R_1$, $R_2$, $f_{min}$, and $V_1$ into equation (1) (2), and obtained that:

$$I_1 = \frac{V_1}{R_1 + j\left(\omega_{min}L_{1max} - \frac{1}{\omega_{min}C_1}\right) + \frac{\omega_{min}^2 M_{12max}^2}{R_2 + R_L + j\left(\omega_{min}L_{2max} - \frac{1}{\omega_{min}C_2}\right)}} \quad (23)$$

$$I_2 = \frac{-j\omega_{min}M_{12max}V_1}{\omega_{min}^2 M_{12max}^2 + \left[R_1 + j\left(\omega_{min}L_{1max} - \frac{1}{\omega_{min}C_1}\right)\right]\left[R_2 + R_L + j\left(\omega_{min}L_{2max} - \frac{1}{\omega_{min}C_2}\right)\right]} \quad (24)$$

where $\omega_{min}=2\pi f_{min}$;
calculating the output power corresponding to the input voltage $V_1$ by the following equation:

$$P_{out\_V_1}=|I_2|^2 R_L \quad (25)$$

with the rated output power being $P_{out}$, obtaining the following inequality:

$$P_{out\_V_1} \geq P_{out} \quad (26)$$

the system is configured to output required power through the phase shift control; and the effective value of the fundamental wave of the square wave required by the system is:

$$V_{1\_P_{out}} = V_1 \sqrt{\frac{P_{out}}{P_{out\_V_1}}} \quad (27)$$

obtaining the effective value of the input current required by the system as:

$$I_{1\_P_{out}} = |I_1| \sqrt{\frac{P_{out}}{P_{out\_V_1}}} \quad (28)$$

with the maximum value of the given input current being $I_{1max}$, obtaining the following inequality:

$$I_{1\_P_{out}} \leq I_{1max} \quad (29)$$

the phase difference between the zero crossing point of the input current and the zero crossing point of the input square wave is:

$$\phi = \theta + 90° - \arcsin\left(\frac{\pi V_{1\_P_{out}}}{2\sqrt{2} \cdot V_{DC}}\right) \quad (30)$$

where $\theta$ is the phase angle of the primary input current phasor $I_1$;
in order to achieve the zero-voltage turn-on of the input inverter, the phase difference is configured to satisfy the following inequality:

$$\phi < 0 \quad (31)$$

5) solving required ranges of $C_1$ and $C_2$ from simultaneous inequalities (17), (20), (22), (26), (29) and (31).

3. The incompletely compensated wireless power transfer system according to claim 1, wherein all combinations of $C_1$ and $C_2$ that meet the conditions are obtained faster than the first method by solving a second group of equations and inequalities, as follows:

1) giving the DC input voltage $V_{DC}$, the rated output direct current voltage $V_{out}$ and the power $P_{out}$, then $$R_L = \frac{8}{\pi^2} \frac{V_{out}}{P_{out}} \quad (32)$$

2) for a given relative position range of the coil of the two coils, obtaining corresponding ranges of the coil inductance and mutual inductance $[L_{imin}, L_{imax}]$ (i=1 or 2), $[M_{12min}, M_{12max}]$ via the finite element simulation, and calculating the coil resistance; according to equations (10) and (11), estimate the capacitor resistance at a strongest coupling position or a weakest coupling position, when in the simplified calculation, the parasitic resistance is neglected;

3) at the weakest coupling position, wherein $M_{12}=M_{12min}$, the operating frequency is the lowest, so that $f=f_{min}$; when a duty cycle of the primary input square wave is 1, so that $$V_1 = \frac{2\sqrt{2}}{\pi} V_{DC} \quad (33)$$

using the input voltage as a reference, so that $V_1=V_1$; substituting $R_L$, $M_{12min}$, $L_{1min}$, $L_{2min}$, $f_{max}$, $R_1$, $R_2$ and $V_1$ into equations (1) and (2), and obtained that:

$$I_1 = \frac{V_1}{R_1 + j\left(\omega_{min}L_{1min} - \frac{1}{\omega_{min}C_1}\right) + \frac{\omega_{min}^2 M_{12min}^2}{R_2 + R_L + j\left(\omega_{min}L_{2min} - \frac{1}{\omega_{min}C_2}\right)}} \quad (34)$$

$$I_2 = \frac{-j\omega_{min}M_{12min}V_1}{\omega_{min}^2 M_{12min}^2 + \left[R_1 + j\left(\omega_{min}L_{1min} - \frac{1}{\omega_{min}C_1}\right)\right]\left[R_2 + R_L + j\left(\omega_{min}L_{2min} - \frac{1}{\omega_{min}C_2}\right)\right]} \quad (35)$$

where $\omega_{min}=2\pi f_{min}$;
calculating the output power corresponding to the input voltage $V_1$ by the following equation:

$$P_{out\_V_1}=|I_2|^2 R_L \quad (36)$$

with the rated output power being $P_{out}$, obtaining the following inequality:

$$P_{out\_V_1} \geq P_{out} \quad (37)$$

under the inequality (37), the system is caused to output a required rated power by the phase shift control; an effective value of a fundamental wave of a square wave required by the system is:

$$V_{1\_P_{out}} = V_1 \sqrt{\frac{P_{out}}{P_{out\_V_1}}} \quad (38)$$

the effective value of the input current required by the system is:

$$I_{1\_P_{out}} = |I_1| \sqrt{\frac{P_{out}}{P_{out\_V_1}}} \quad (39)$$

with a maximum value of the given input current being $I_{1max}$, obtaining the following inequality:

$$I_{1\_P_{out}} \leq I_{1max} \quad (40)$$

a phase difference between a zero crossing point of the input current and a zero crossing point of the input square wave is:

$$\phi = \theta + 90° - \arcsin\left(\frac{\pi V_{1\_P_{out}}}{2\sqrt{2} \cdot V_{DC}}\right) \quad (41)$$

where θ is a phase angle of the primary input current phasor $I_1$,
in order to achieve zero-voltage turn-on of an input inverter, the phase difference is configured to satisfy the following inequality:

$$\phi < 0 \quad (42)$$

4) at the strongest coupling position, wherein $M_{12}=M_{12max}$, the operating frequency is the highest, so that $f=F_{max}$; assuming that when the duty cycle of the input square wave is 1, using the input voltage as a reference, that is, $V_1=V_1$; substituting $R_L$, $M_{12max}$, $L_{1max}$, $L_{2max}$, $R_1$, $R_2$, $f_{min}$ and $V_1$ into equations (1) (2), and obtaining the followings:

$$I_1 = \frac{V_1}{R_1 + j\left(\omega_{max}L_{1max} - \frac{1}{\omega_{max}C_1}\right) + \frac{\omega_{max}^2 M_{12max}^2}{R_2 + R_L + j\left(\omega_{max}L_{2max} - \frac{1}{\omega_{max}C_2}\right)}} \quad (43)$$

$$I_2 = \frac{-j\omega_{max}M_{12max}V_1}{\omega_{max}^2 M_{12max}^2 + \left[R_1 + j\left(\omega_{max}L_{1max} - \frac{1}{\omega_{max}C_1}\right)\right]\left[R_2 + R_L + j\left(\omega_{max}L_{2max} - \frac{1}{\omega_{max}C_2}\right)\right]} \quad (44)$$

where $\omega_{max}=2\pi f_{max}$;
calculating the output power corresponding to the input voltage $V_1$, by the following equation:

$$P_{out\_V_1} = |I_2|^2 R_L \quad (45)$$

with the rated output power being $P_{out}$, obtaining the following inequality:

$$P_{out\_V_1} \geq P_{out} \quad (46)$$

under equation (46), the system is configured to output the required power by the phase shift control; at this time, the effective value of the fundamental wave of the square wave required by the system is:

$$V_{1\_P_{out}} = V_1 \sqrt{\frac{P_{out}}{P_{out\_V_1}}} \quad (47)$$

obtaining the effective value of the input current required by the system:

$$I_{1\_P_{out}} = |I_1| \sqrt{\frac{P_{out}}{P_{out\_V_1}}} \quad (48)$$

with the maximum value of the given input current being $I_{1max}$, obtaining the following inequality:

$$I_{1\_P_{out}} \leq I_{1max} \quad (49)$$

the phase difference between the zero crossing point of the input current and the zero crossing point of the input square wave is:

$$\phi = \theta + 90° - \arcsin\left(\frac{\pi V_{1\_P_{out}}}{2\sqrt{2} \cdot V_{DC}}\right) \quad (50)$$

where θ is the phase angle of the primary input current phasor $I_1$,
in order to achieve the zero-voltage turn-on of the input inverter, the phase difference is configured to satisfy the following inequality:

$$\phi < 0 \quad (51)$$

5) solving required ranges of $C_1$ and $C_2$ from simultaneous inequalities (37), (40), (42), (46), (49), (51).

4. The incompletely compensated wireless power transfer system according to claim 1, wherein all combinations of $C_1$ and $C_2$ that meet the conditions are configured to be obtained faster than the first method by using a traversal calculation method, specifically as follows:

a) for a given relative position range of a coil of the two coils, first obtaining corresponding ranges of coil inductance and mutual-inductance [$L_{imin}$, $L_{imax}$], [$M_{12min}$, $M_{12max}$] via the finite element simulation;

b) when the operating frequency of the system is $f_{min}$ at $M_{12min}$ and that the operating frequency of the system is $f_{max}$ at $M_{12max}$; calculating a center primary side compensation capacitance $C'_1$ and a center secondary side compensation capacitance $C'_2$ under full compensation at $M_{12min}$; setting $C'_1$, $C'_2$ as centers, determining a range of $C_1$ and $C_2$ to be undergo traversal of a range of: [$C_{1min}$, $C_{1max}$], [$C_{2min}$, $C_{2max}$], selecting a value of capacitance combination in the range of [$C_{1min}$,$C_{1max}$], [$C_{2min}$, $C_{2max}$] in an exhaustive manner, and when the calculated coupling is $M_{12min}$ and $M_{12max}$, respectively, verifying one by one to determine whether the selected value of the capacitance combination meets equations (1)-(9), if the selected value of the capacitance combination meets the equations (1)-(9), then keeping the capacitance combination, if the selected value of the capacitance combination does not meet the equations (1)-(9), then removing the capacitance combination;

c) when the operating frequency of the system is $f_{max}$ at $M_{12min}$ and that the operating frequency of the system is $f_{min}$ at $M_{12max}$, calculating the center primary side compensation capacitance $C''_1$ and the center secondary side compensation capacitance $C''_2$ under full compensation at $M_{12min}$; setting $C''_1$, $C''_2$ as the centers, determining the range of $C_1$ and $C_2$ to undergo traversal of the range of: [$C_{1min}$, $C_{1max}$], [$C_{2min}$, $C_{2max}$], similarly, selecting the value of the capacitance combination in the range of [$C_{1min}$,$C_{1max}$], [$C_{2min}$, $C_{2max}$] in the exhaustive manner, and when the calculated coupling is $M_{12min}$ and $M_{12max}$, respectively, verifying one by one to determine whether the selected value of the capacitance combination meets the equations (1)-(9), if the selected value of the capacitance combination meets the equation (1)-(9), then keeping the capacitance combination, if the selected value of the capacitance combination does not meet the equations (1)-(9), then removing the capacitance combination; and d) obtaining a solution set of the capacitance combination that meets the conditions through the above two steps; if the solution set is an empty set, appropriately relaxing restriction in the equations (1)-(9), and conducting traversal again to obtain the solution set of the capacitance combination that meets the conditions.

\* \* \* \* \*